(No Model.)
L. F. CASTOR.
TWO WHEELED VEHICLE.
No. 294,009. Patented Feb. 26, 1884.
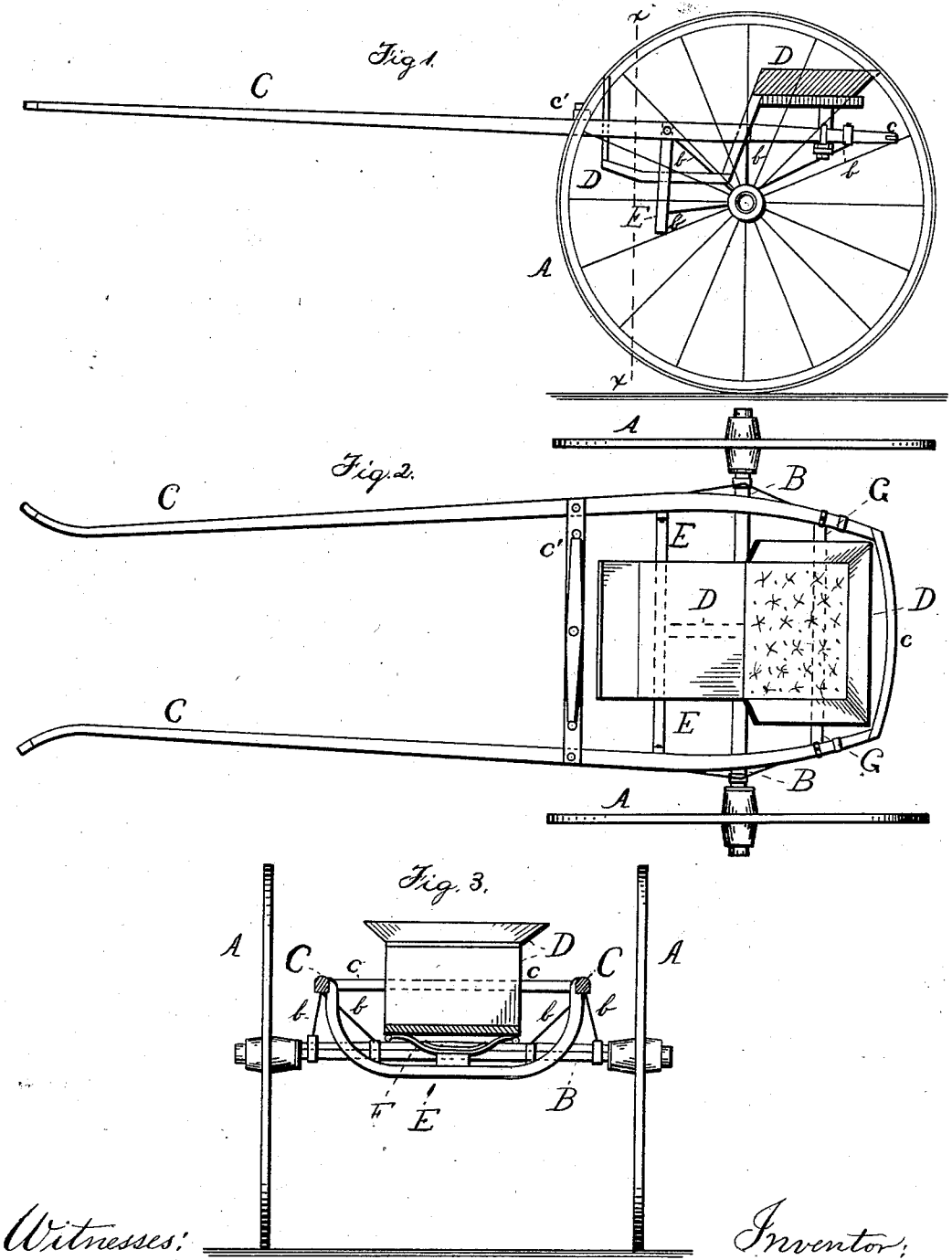
Witnesses:
James T. Nulty
Lewis P. Allen
Inventor:
Lewis F. Castor
by
Lewis F. Brous
Atty.

UNITED STATES PATENT OFFICE.

LEWIS F. CASTOR, OF PHILADELPHIA, PENNSYLVANIA.

TWO-WHEELED VEHICLE.

SPECIFICATION forming part of Letters Patent No. 294,009, dated February 26, 1884.

Application filed December 18, 1883. (No model.)

*To all whom it may concern:*

Be it known that I, LEWIS F. CASTOR, a citizen of the United States, residing in Frankford, Philadelphia, in the county of Philadelphia and State of Pennsylvania, have invented a new and useful Vehicle, of which the following is a specification.

My invention relates to that class of vehicles known as "brake-carts;" and the principal features of it are the extending or continuing of the shafts in one piece to each side and to the rear of the seat portion of the body, to give a bearing to the rear spring supporting mostly the seat, and to the use of a bent or an elliptic bar secured to the shafts transversely, which supports the front spring carrying the front portion of the body, the value and practicability of which plan of construction I will now describe, reference being had to the accompanying drawings, in which—

Figure 1 is a side view of the device embodying my invention. Fig. 2 is a top view thereof. Fig. 3 is a vertical section in the line *x x* of Fig. 1.

Similar letters refer to similar parts throughout the several views.

Referring to the drawings, A A represent the only two wheels which vehicles of this kind possess, mounted upon an axle, B. The shafts C C, which are braced, *b b b b*, to the axle B, pass to each side and to the rear of the body D. A supplemental and bent or elliptic bar, E, is secured to the shafts C C at a suitable distance in front of the axle B, which is supplied with a spring, F, which carries or supports the front of the body D. At a suitable distance in the rear of the body D is clipped or otherwise secured to the shafts C C the spring G, which in turn carries or supports the rear of the body D, comprising, principally, the seat of the vehicle. The shafts C C, passing to the rear of the body D, are connected by the transverse bar *c*, with the additional cross-bar *c'* which supports the single-tree in front of the body D, and has the bent or elliptic bar E for a brace. It will at once be seen that I construct a substantial frame for the support of the body.

The manner in which I secure the front spring, F, and the rear spring, G, preserves the poise of the body and the full elasticity of said springs, the weight being distributed evenly throughout the frame-work supporting the body.

The bent or elliptic bar E is a suitable distance from the front of the body D to be entirely removed from the feet of the horse, and all danger from striking the same is obviated, when the vehicle is in motion; and, besides, I am by this means better enabled to make a much neater form of what is known as a "dropped" or "curved" body.

I am aware that vehicles known as "sulkies" have been and are constructed, in which the shafts are continued to the rear to support the seat, such an arrangement being the means, when constructed, of making a beautiful, cheap, and durable road-cart.

Having thus described my invention, what I claim as new, and desire to secure by Letters Patent, is—

In a two-wheeled vehicle, the combination of the shafts C C, having cross-bars *c c'*, axle B, bent or elliptic cross-bar E, spring F, dropped or curved front body D, and the spring G, the whole arranged as described, and for the purpose specified.

LEWIS F. CASTOR.

Witnesses:
WM. B. HILT,
LEWIS F. BROUS.